Feb. 7, 1961    S. R. OVSHINSKY    2,971,071
MAGNETIC RELAY
Filed March 11, 1957    2 Sheets-Sheet 1
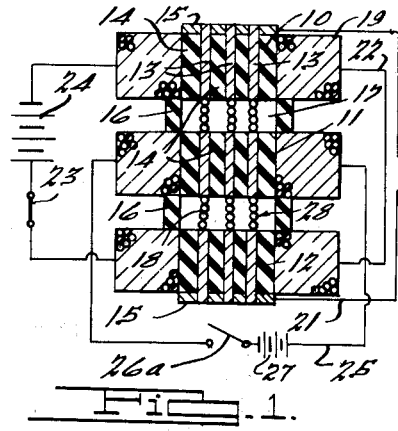
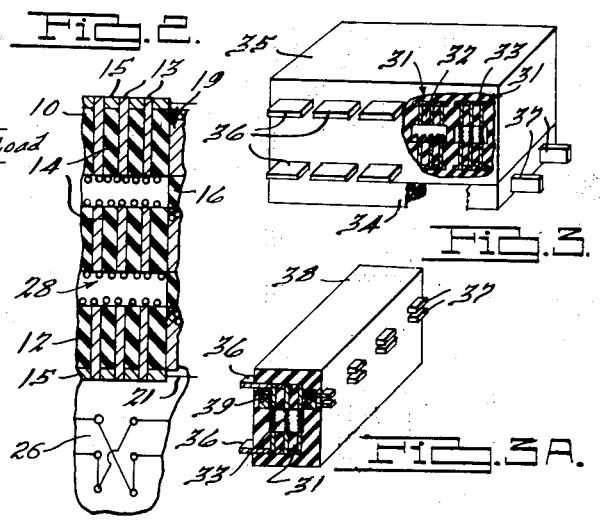
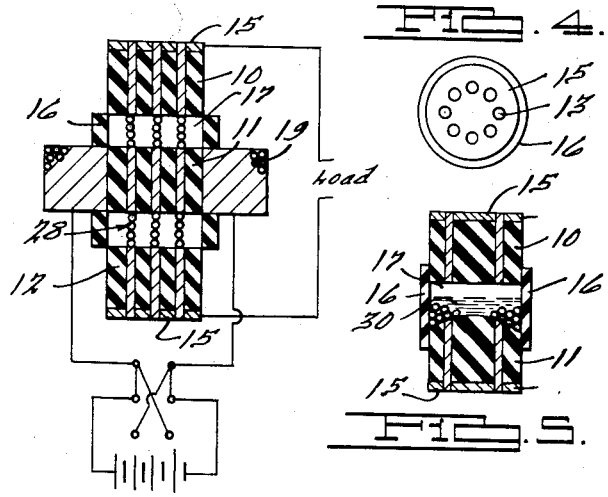
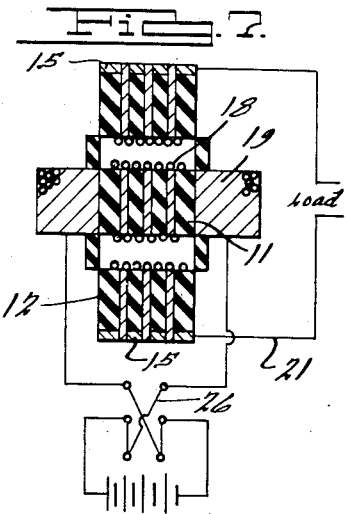
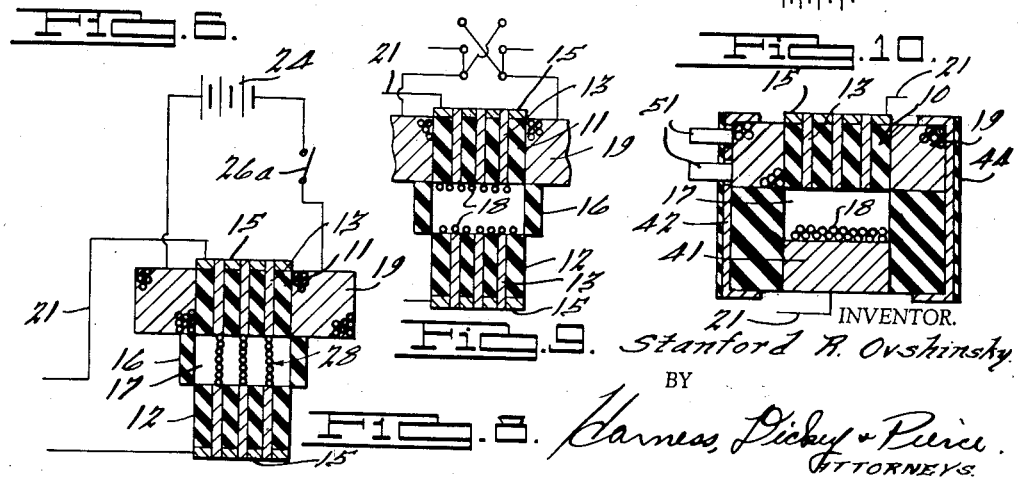
INVENTOR.
Stanford R. Ovshinsky
BY
Harness, Dickey & Pierce
ATTORNEYS.

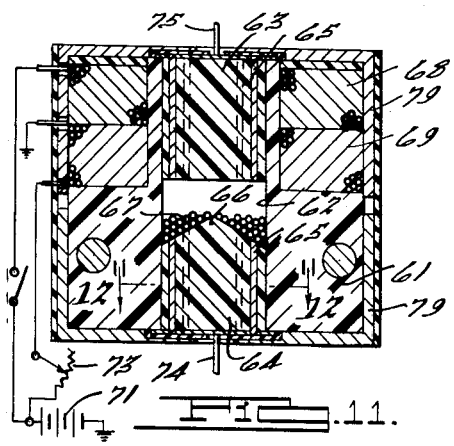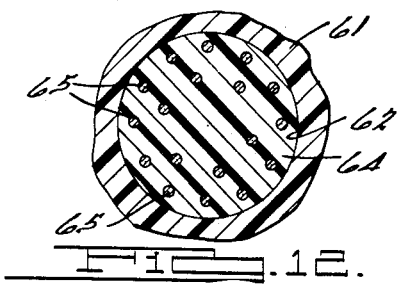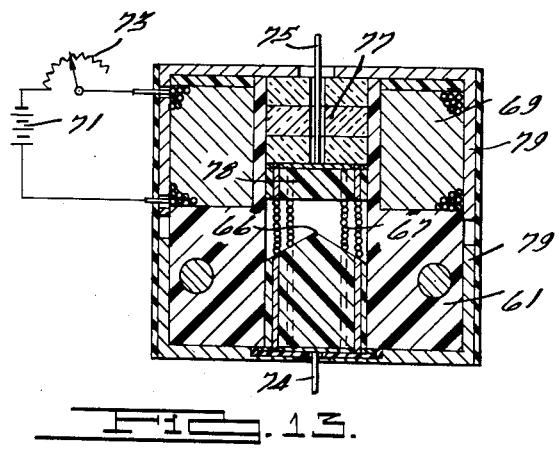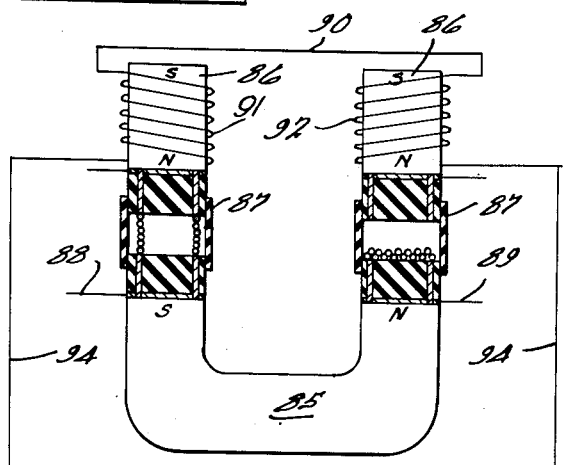

United States Patent Office 2,971,071
Patented Feb. 7, 1961

2,971,071

MAGNETIC RELAY

Stanford R. Ovshinsky, Detroit, Mich., assignor to Tann Corporation, Detroit, Mich., a corporation of Michigan Filed Mar. 11, 1957, Ser. No. 645,260

14 Claims. (Cl. 200—87)

This invention relates to magnetic relays, and particularly to a magnetic relay which controls the passage of a substantial amount of current by a small amount of energizing current from an A.C. or D.C. source.

The relay is preferably made of spaced grids having metal elements therein of magnetizable or nonmagnetizable material which provides conductive paths across the cavities formed by the spaces. Magnetizable precision balls are provided in the cavities which form conducting chains in the flux paths which are oriented across the cavity between the ends of the elements, the number of which is controlled by the energizing current. The making and breaking of the chains is produced by the flux of one or more coils associated with one or more of the grids which, when energized, provides flux in one or a reverse sense, to thereby produce attraction or repellant paths or zero flux across the cavities between the grids.

It is desirable to use a material for the metal elements of the grids and for the balls which has the strains released therefrom by proper annealing so that the material will become magnetically saturated with the lowest amount of applied energy and which will become demagnetized in the shortest amount of time after the applied energy is cut off. The elements and balls have substantially no residual properties and upon a change in applied energy, such as to remove the force for retaining the balls in conducting chains, they will immediately separate and fall to the bottom of the cavity by gravity. Where the flux is reversed or the balls have like charges thereon, in addition to the gravity a repellent force will assure the rapid disintegration of the chains. The balls may be coated with conducting material to readily pass the current without resistance or heating, and the amount of current passed through the relay may be controlled by the amount of current supplied to the coil. In some cases the mere reversal of the flow of current in the coil produces the making and breaking of the chains and therefore the making and breaking of the circuits associated therewith. In other cases the increase or reduction of flux across the cavity between the grids will make or break the conducting chains. Any number of the grid devices may be assembled into a unit structure, with each cavity controlling a circuit, all under the influence of a single coil which reverses the condition of the circuit each time the flow of current in the coil is changed, modified and/or reversed, that is to say, the circuits which are closed are opened while the circuits which are open are closed due to the change of flow of current in the coil. It is to be understood that individual coils may be employed which may be energized or deenergized simultaneously to change all the circuits or energized individually to change the circuits separately.

Each of the grids may be provided with a coil or a plurality of coils so that the circuits may be individually controlled by the making, breaking, or reversing the flow of current in one or more of the coils. Each grid may be formed of spaced-apart lengths of the same or similar material which may be permanent magnets or magnetizable material or other conducting material which is magnetically affected by the energizing coil associated therewith. The conducting elements are spaced apart by insulating material and are aligned across the cavity to provide focused and oriented flux paths which repel or attract the balls, depending upon the superimposing of one magnetic field on another in the same or in an opposite sense. The relationship of the grids, the material of the elements thereof, the diameter of the precision balls and the heat-treating process applied to the balls and elements are all chosen to produce the most efficient and accurate form of device for controlling a circuit. The energizing current may be obtained from any available A.C. source or from a D.C. source which may be obtained by rectifying the A.C. source or from any D.C. signal control.

Accordingly, the main objects of the invention are: to provide a relay which controls the passage of a heavy current by the passage of a small A.C. or D.C. energizing current; to provide a relay having a substantial number of open and closed gaps which are under the control of a single or a plurality of coils or permanent magnets; to provide a relay having a plurality of gaps across which conducting paths may be formed by coils or permanent magnets associated with each of the paths; to provide a relay made from a plurality of similar grids having focusing elements therein of conducting material, the flux energy through which is controlled by superimposing flux energy from a different source thereover for making and breaking conducting paths which complete and interrupt the associated circuits, and, in general, to provide a relay device which controls the passage of a substantial amount of current by the use of a low energizing source which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a diagrammatical view in section of a relay device and associated circuits embodying features of the present invention;

Fig. 2 is a broken view of the structure illustrated in Fig. 1 when the circuit therethrough is interrupted;

Fig. 3 is a view in elevation, with parts in section, of a device having a plurality of circuits therethrough controlled by a single coil;

Fig. 3a is a view of structure, similar to that illustrated in Fig. 3, in which each of the conducting elements is controlled by an individual coil;

Fig. 4 is a plan view of the grid element illustrated in Fig. 1;

Fig. 5 is a vertical sectional view through a pair of spaced grids showing another form which the invention may assume;

Fig. 6 is a view of structure, similar to that illustrated in Fig. 1, with the upper and lower coils removed and with a circuit completed therethrough;

Fig. 7 is a view of the structure illustrated in Fig. 6, showing the circuit interrupted;

Fig. 8 is a view of structure, similar to that illustrated in Fig. 6, with the upper grid removed and with a circuit completed therethrough;

Fig. 9 is a view of the structure illustrated in Fig. 8 showing the circuit interrupted;

Fig. 10 is a view of structure, similar to that illustrated in Fig. 9, with a solid conducting element substituted for the lower grid thereof;

Fig. 11 is a sectional view of structure, similar to that illustrated in Fig. 8, showing another form which the invention may assume;

Fig. 12 is an enlarged broken sectional view of the structure illustrated in Fig. 11, taken on the line 12—12 thereof;

Fig. 13 is a view of structure, similar to that illustrated in Fig. 11, showing another form of the invention, and Fig. 14 is a schematic arrangement of a device incorporating another form of the invention.

Referring to Figs. 1 and 2, the device of the present invention embodies a plurality of grids, the embodiment illustrated having three grids 10, 11 and 12 each of which is made of like material to provide a plurality of elongated magnetizable elements 13 which may be of cylindrical, square, rectangular or other shape, separated by magnetic insulating material 14. The outer ends of the grids 10 and 12 have conducting plates 15 which are secured in conducting relationship to the plurality of elements 13. The three grids 10, 11 and 12 are mounted together as a unit by suitable means and separated from each other by insulating elements 16 which form cavities 17 therebetween of the same cross-sectional area of the grids. The grids may be circular, square, rectangular or of any form.

Within the cavities 17 a plurality of balls 18 are provided, the balls and the elements 13 being made of a special magnetic material, such as nickel-iron, preferably of a fifty-fifty ratio of the two elements, or a variation of these materials to require a small coercive force to produce saturation. Other combinations of materials known in the art to provide the same properties may be employed. Proper annealing of this material adds materially to the property of producing the saturation of the balls by a small coercive force and the substantial elimination of the residual forces which permit the instantaneous completion of conducting chains of balls upon energization and the immediate breaking of such chains upon de-energization. For example, it is found that circuits may be made and broken with the device of the present invention with balls and grids of proper materials at various cycles of such short intervals not considered possible heretofore.

The grids may be made of magnetic or magnetizable material and are separated from each other by the material of the grid body which is nonmagnetizable. Thus, the grid may be made of ceramic or nonmagnetic stainless steel which will withstand annealing temperatures. Such material provides high precision control since the physical working by insertion of the grid elements after annealing into the apertures of the grid body would change the magnetic characteristics of the element material. A nonmagnetic material which will withstand the heat of annealing has apertures into which the elements are inserted before the annealing operation. Preferably, the material selected is one which has a coefficient of expansion substantially equal to that of the material of the elements so that there will be no strains set up between the materials when a change in temperature occurs. The conducting plates 15 as illustrated may be employed to interconnect the elements, or silver or other conducting material may be built up on the body to connect the elements to a conductor. For example, stainless steel having nonmagnetic qualities has been employed as the body of the grid, the elements 13 being forced into the apertures thereof before the heat-treating process. The body material can also be a ceramic, resin or similar material which magnetically and electrically insulates the elements from each other.

A wound coil 19 of predetermined size wire and number of turns is placed about each of the grids 10, 11 and 12 for the purpose of controlling the magnetization of the elements 13 of the grids. Current to be passed is connected in a circuit 21 which is joined to the end plates 15 in series through the grids and with the load to be energized. A circuit 22 connects the coils 19 of the grids 10 and 12 in a circuit with a switch 23 and a source of low current 24 if a D.C. energizing current is to be employed, herein illustrated as a battery. A circuit 25 connected to the coil 19 of the grid 11 passes through a switch 26a which is herein illustrated as a single-pole, single-throw type but which may be a double-pole, double-throw type to reverse the current flow in the coil, as illustrated in Fig. 2. The switch and circuit are connected to a low power source which is herein illustrated as being a battery 27.

A further modification of the device may be made by changing the elements 13 to a permanent magnetic material in one or more grids and constructing them of different sizes to control the focusing of the adjacent end faces relative to each other. Orientation further may be obtained by rotating one of the grids relative to the other to change the chain paths. Further, the magnetizable elements of one grid may take a different pattern from those of another grid so that in rotating one relative to the other the number of focusing paths may be changed. Therefore, there are many modifications which can be made to the structures illustrated in Figs. 1 and 2 above described, all within the purview of the present invention. In a similar manner along this line, permanent and nonpermanent magnetic elements 13 may be interchanged within a specific grid.

In Figure 1 the device is illustrated as having chains 28 formed of the balls between the magnetizable elements 13 to complete a flow of current through the circuit 21 to the load. In this example, this is accomplished by changing the polarity of the magnetic elements 13 of the grid 11 by energizing the central coil 19 thereabout by closing the switch 26a. When the switch 26a is open, the central coil 19 is de-energized, reversing the polarity in the elements 13 of the grid 11, thereby permitting the chains of balls to be quickly broken by gravity and by the repellent force occurring due to the reversing of the polarity of the elements 13 in the grid 11. In another example, if the de-energization of the coil 19 merely reduced but did not reverse the polarity, so that the flux paths are not of sufficient strength to maintain the chains 28, these would be broken by gravity alone. The flux added by the central coil 19 increases the strength of the flux paths to cause the chains to be formed by the balls when the switch 26a is closed.

In Fig. 2 a switch 26 is illustrated of the double-pole, double-throw type in place of the switch 26a of Fig. 1. The switch is shown as being thrown to reverse the flow of current to the central coil 19 which reverses the polarity of the elements 13 of the grid 11 to make or break the chains according to the polarity of the elements of the grids 10 and 12. In the figure, the reversing of the current has broken the chains and provided a repellent force for causing the balls to move away from each other.

The cavities 17 in the device illustrated in Fig. 2 may be reduced in height or may have more balls added thereto so that the cavities are substantially filled with the balls. This requires the balls to move only a very short distance to complete the chains across the cavities. It is desirable to apply a certain amount of current to the coils 19 of the grids 10 and 12 to produce a bias on the balls across the cavity sufficient to almost but not quite form chains of the balls. The addition or subtraction of flux produced by the central coil 19 of the grid 11 will cause the formation of the chains to occur simultaneously with the application of the current to the central coil 19 of the grid 11. It is the play of the flux from the individual coils that is desired in the arrangement. In other words, in Figs. 1 and 2 the coils 19 of the grids 10, 11 and 12 each may be energized from a different source at the same or different voltage and current, with the coils wound in the same or different directions to control the chains. The chains may be formed only at the time a proper energization of all three coils occurs to produce the proper polarity across both of the cavities. In this arrangement, three distinct indications of current are necessary to complete a circuit through the device. The body of the central grid 11 is preferably made of conducting material so that a lead may be taken therefrom. In this arrangement, the device may have a circuit normally open while the other circuit is normally closed and either circuit may be controlled by the variation of flux produced by the coils of grids 10 and 12 and both may be affected by the change of flux produced by the central coil 19 of the central grid 11. While the flux is illustrated as being produced by coils, it is to be understood that permanent magnets may be employed and shifted from one position to another, to produce the change of flux by adding, subtracting and removing. It is understood that the elements 13 in a similar manner may be permanent magnets rather than magnetizable materials, thereby giving substantially greater variations in the functioning of the device.

The direction of flow of current through the central coil 19 of the grid 11 produces a repellent polarity between the magnetizable elements 13 of the three grids. This separates the chains and isolates the balls 18, as illustrated in the figure. Upon reversing the flow of current in the circuit 25 by operating the switch 26 to its other position, the energization of the magnetizable elements 13 of the grid 11 is reversed so that an attractive polarity occurs between the magnetizable elements 13 in the respective grids which produces the formation of chains 28 of the balls 18, as clearly shown in Fig. 1. Sufficient of the magnetizable elements 13 are provided to produce a desired number of the chains 28 to pass the amount of current through the chains which is required for the load. When a selected amount of current is to be passed through the device, the balls 18 are preferably coated with a conducting material, such as silver, copper and the like. When a limited amount of current is to be passed, the balls may be employed without a coating thereon or a coating of a material of a specific resistivity may be utilized to limit the amount of current passing through the chains. The chains will function as resistors, and by varying the input current in the circuit 22 the number of chains 28 which will form can be controlled. The amount of current which will pass through the chains 28 is controlled by the resistance thereof and the variation in the number of chains which are formed will vary the amount of current which is passed.

Magnetic material of the permanent type may be employed as elements 13 in any one, two or all three of the grids and the formation of the chains therebetween may be controlled by a coil or coils associated with one, two or all three of the grids. Thus, the grids may have the elements 13 thereof made of different magnetizable materials, and in some instances may be merely conductive material and may be employed in pairs across the cavities to pass or interrupt the flow of current by a bias produced thereon by coils applied to any or all of the grids. Thus, for example, by changing the direction of flow of current in the individual coils of grids 10 and 12, or by changing the polarity of the magnetic elements of the grids 10 and 11, or by reducing the amount of flux in certain of the grids, the lower two grids 11 and 12 may pass current through chains formed therebetween, while the upper two grids 10 and 11 may break the chains and interrupt a flow of current. By changing the energization of the central coil 19 on the central grid 11, a reverse effect will occur, chains will be formed between the grids 10 and 11 and the chains between the grids 11 and 12 will be broken. The grids could be employed in circuitry by having the magnetic force impressed upon grids 10 and 12, for example, without results until a magnetic force is biased upon the grid 11 which controls the formation and breaking of the chains between the grids.

In the device illustrated in Figs. 3 and 3a, any number of grids and cavities may be employed, controlled by a plurality of coils, as illustrated in Fig. 3a, or by a single coil 34, as illustrated in Fig. 3. A number of grid devices 31 are selected corresponding to the number of closed or open circuits which may be desired. For example, the grid 32 is illustrated as an open circuit, while the grid 33 is illustrated as a closed circuit, the grid elements being permanent magnets, the flux of which is reduced or negated by that of the coil when the coil is energized and any number of open and closed circuits may be provided by the number of the grid devices 31 employed, all controlled individually or by a single coil to break the chains of the closed circuits and make chains across the open circuits. In Fig. 3 a single coil 34 is employed with the devices 31, all of which is formed into a unit by the case 35. Blades 36 connect the grids of the devices, while blades 37 are connected to the coil 34. In Fig. 3a, a case 38 encloses the devices 31 which have individual coils 39 disposed thereabout. The circuits of the devices 31 which are made or broken may be reversed through the operation of a single coil 34 of Fig. 3 influencing all of the devices 31, or by the operation of individual coils 39 associated with each of the devices 31 of Fig. 3a. Thus, the magnetic elements 13 of the grids may be permanent magnets and the polarity reversed through the energization of a single coil. Permanent and nonpermanent magnet types of grids, the latter with coils associated therewith, may be interspersed in a unit assembly of the devices 31.

In Fig. 4 a plan view of a grid 10 is illustrated having a plurality of the magnetizable elements 13 disposed in a circle in the magnetically insulated body member 14. These may be accurately aligned with the elements in the next adjacent grid 11 to produce accurate focusing of the flux paths, or the elements may be placed in different predetermined positions in the grids so that the rotation of one grid relative to the other will focus a lesser or greater number of the magnetizable elements between the two grids to control the number of chains which are formed. It is also within the purview of the invention to make the elements 13 of one grid of greater diameter than those of the other to assure the accurate focusing between the elements of adjacent grids. The cross-sectional area and shape of the magnetizable elements in one grid may be different from those in the other and, as pointed out above, may be dispersed in a different manner in the body portion 14 for the purpose of changing the number of chains which will be produced at different rotative positions of the two grids. The upper end of the grid 11 is shown as having a conical shape at the end forming the bottom of the cavity which varies the strength of the flux paths and causes the balls to collect on the lower outer surface when the grids are de-energized. It is to be understood that the upper end of the grid 11 may take other shapes which affect the focusing and control the formation of the flux paths. A pool of mercury 30 may be placed in the bottom of the cavity 17 for coating the balls and making conducting paths therebetween when chains are formed.

In Figs. 6 and 7 a further form of device for transferring current is illustrated, that wherein coils 19 have been omitted from grids 10 and 12. The material of the elements 13 forms permanent magnets of predetermined polarity so that chains will be formed when the coil 19 of the central grid 11 is energized to produce a flux in one direction, as illustrated in Fig. 6, and when energized in the opposite direction, through the operation of the switch 26, will produce a reversal of flux so as to repel the balls 18 and break the chains, as illustrated in Fig. 7. The same result can be obtained if the elements 13 of the central grid 11 are permanent magnets, providing an attractive force across one cavity and a repellent force across the other. The magnetic force of the grid 11 is reduced or reversed when the coil 19 is energized, reversing the force across the grids to make and break the chains, as the case may be. In such an arrangement, the switch 26a is of the single pole type. The same effect will occur when the magnetic material of elements 13 of one or all of the grids is changed to other materials which are conductive but not magnetic. The field produced by the coil 19 on the central grid 11 will affect the elements 13 of the grids 10 and 12 which will produce chains 28 and complete a circuit through the conductors 21. When a like amount of current is to be passed each time through the device, a coating of conductive material is applied to the surface of the balls 18, and when not so coated the balls will act as resistor elements, and by changing the amount of current to the coil 19, the amount of current flowing through the circuit 21 may be controlled. To provide further assurance that the current will readily pass through the chains, a well of mercury may be provided in the bottom of the cavity 17 of a sufficient depth to cover the balls so that they will become coated, and when drawn into chains the mercury will aid in providing greater conductivity therethrough. It is to be understood, as pointed out above, that the chains formed between the grids 10 and 11 and 11 and 12 may provide a normally open and normally closed circuit, respectively, which is reversed upon the change in the energization of the coil 19, opening the closed circuit and closing the open circuit.

In Fig. 8, a further form of the invention is illustrated, that wherein the grid 10 of the structure of Figs. 6 and 7 is eliminated and the device is constructed from the grids 11 and 12. In this arrangement, the elements 13 of the grid 12 are of magnetizable material. When the switch 26a is open, the strength of the magnetism of the elements 13 is sufficient to produce the plurality of chains 28 across the cavity 17 between the two grids, as illustrated in the figure. Upon the closing of the switch 26a, the current from a source, herein illustrated as a battery 24, will energize the coil 19 to produce magnetic flux which will negate the flux of the magnets 13, which thereby will permit the chains 28 to be broken and the balls 18 attracted by gravity to the bottom of the cavity.

In Fig. 9 a somewhat similar arrangement is illustrated, that wherein the circuit to the coil 19 and battery 24 is through a double-pole, double-throw switch 26. The elements 13 of the grid 12 are permanent magnets, while the elements 13 of the grid 11 are either permanent magnets or of magnetizable material. When the switch 26 is in the position as illustrated in the figure, the adjacent ends of the elements 13 of the two grids are of like polarity so that a repellent force will occur therebetween to break the chains. Upon the reversal of the switch 26, a reverse flow of current occurs in the coil 19, reversing the polarity on the elements 13 of the grid 11 so that the adjacent ends of the elements 13 of both of the grids will be of different polarity and chains 28 will therefore be formed, passing current through the circuit 21.

While the devices herein illustrated are not sealed, it is to be understood that the device may be sealed and a vacuum or inert gases employed within the cavity to reduce contamination and erosion and avoid any fire hazard.

In Fig. 10 a still further form of the invention is illustrated, that wherein a single grid 10 is employed in combination with a conducting body 41 to provide a cavity between the body and a grid for the balls 18. The balls are attracted to produce chains when the coil 19 is energized in one sense and the chains are broken when the coil is energized in an opposite sense or when the current is cut off to the coil without reversal, if the elements 13 are permanent magnets. A similar conducting body, one which is magnetic, could be employed above the grid 10 spaced to provide a cavity 17 containing balls 18 to produce a normally closed circuit when the circuit between the illustrated grids 10 and the body 41 is a closed circuit. The circuits are opened or closed when the flow of current in the coil is interrupted, reduced or reversed.

The coil 19 and insulting material of the body are enclosed within a conducting magnetizable element 42 which provides a low resistant path for the flux of the coil 19 which materially strengthens the flux paths across the cavity 17. The elements 13 focus the paths of flux across the cavity, to thereby more accurately control the formation of the chains of balls thereacross. This provides greater efficiency to the assembly in that a maximum amount of flux will be provided across the cavity for a minimum amount of coil energization. It is to be understood that the relay of this type may have knife blades 51 connected to the ends of the leads of the coil 19 and secured by the insulating material 44 which surrounds the element 42. The blades may form the sole support for the relay when inserted in sockets connected in a circuit.

In any of the embodiments herein illustrated, a relay is provided which is capable of passing a substantial amount of current through the use of a relatively small amount of energy of the A.C. or D.C. type. The device may be so constructed that certain of the circuits are made when others are interrupted by the energization or de-energization of a coil, the reversal of current thereto or the interplay of the flow of the coil. A plurality of circuits may be controlled by a single device having superimposed flux added or retracted from the grid elements by controlling the energization of all or a part of the coils. The magnetizable elements are preferably individual members so as to focus and concentrate the flux paths and have the chains quickly made and broken and to control the number of chains which are formed. The information of the chains may occur by using the flux of an associated coil or permanent magnet when the elements are conductive but nonmagnetic. The use of of proper magnetic material which is annealed preferably to a precise formula provides balls which are readily magnetized and demagnetized so that the making and breaking of the circuit can occur in a very small period of time.

Referring to Figs. 11 and 12, a relay is illustrated having an insulating body portion 61 provided with a central aperture 62 in which an upper grid 63 and a lower grid 64 are disposed. The grids have a plurality of magnetic or magnetizable elements 65 extending therethrough in aligned relation and disposed in circular arrangement outwardly of the central portion of the grids adjacent to the peripheral wall thereof. The lower grid 64 has its upper face 66 of conical shape so that the magnetic or magnetizable balls 67 may drop downwardly and move to the space of the central aperture 61 between the grids. A pair of coils 68 and 69 are mounted within the body 61 about the upper grid 63. Current from a suitable source is supplied to the coils 68 and 69 herein illustrated as from a battery 71 in a manner that the coil 68 may be energized without energizing the coil 69 so that upon the energization of the coil 68 chains will be formed of the balls between the elements 63 and 64. The coil 69 is preferably wound in the opposite direction from the coil 68 so that the flux thereof will oppose the flux produced by the coil 68. When the coil 69 is energized, the flux thereof will erase the flux produced by the coil 68 so that the chains between the elements 65 will be broken and the balls will fall by gravity into the position illustrated. It is to be understood that a rheostat 73 may be placed in the circuit to the coil 69 so that the force may be reduced an amount to reduce the magnetic flux produced by the coil 68 to thereby reduce the number of chains across the cavity rather than have all of the chains interrupted. In this manner, the amount of current which is passed through the conductors 74 and 75 across the grids may be accurately controlled.

The device illustrated in Fig. 13 is the same as that of Fig. 11 with the exception that for the gird 63 is substituted a block or a plurality of layers 77 of a ceramic magnetic material disposed forming permanent magnets above a section 78 of a grid which normally forms chains of the balls 67 provided in the space 62 within the body 61. A two-part casing 79 of conducting material surrounds the body 61 and forms a low resistant path for the flux produced by the washerlike elements 77 and the coil 69. By energizing the coil 69 from a source, such as a battery 71, by an amount controlled by the rheostat 73, an opposing flux will be provided which "bucks" the flux produced by the washerlike element 77 and thereby causes the chains 67 to be broken either simultaneously or progressively so as to interrupt the circuit or reduce the amount of current being supplied therethrough.

In Fig. 14 a still further form of the invention is illustrated, that wherein a permanent magnet 85 has its ends spaced from a pair of magnetizable elements 86 by the grid devices 87 which are similar to the devices hereinabove referred to. The elements 86 have like polarity at the upper and lower ends when the coils 91 and 92 are energized, the lower end of the left-hand magnet providing an attractive force across the device 87 at the left-hand branch of the magnet 85 and while the right-hand magnet produces a repellent force across the device 87 at the right-hand branch thereof. Thus, two independent circuits are controlled by the relay, the one indicated at 88 as being completed by showing the balls formed into chains, the other indicated at 89 as being interrupted by the chains being broken. The pair of coils 91 and 92 are wound in the opposite direction and are interconnected by the conductor 90 and connected to a double-pole, double-throw switch 93 by the conductors 94. The double-throw switch produces a reversal of flux in the magnetizable material of the elements 86 upon reversing the flow of current to the coils 91 and 92. The poles of the magnetizable material of the elements 86 are changed when the flow of current through the coils 91 and 92 is reversed. The south poles indicated at the top in the figure would be at the bottom and the north poles indicated at the bottom would be at the top. A repellent force would occur across the grid of the left-hand device 87 to interrupt the current flow in the conductors 88, while an attractive force is provided across the grid of the right-hand device 87 to complete a circuit to the conductors 89. Thus, by reversing the switch 91, one of the circuits 88 and 89 is interrupted while the other is completed. The advantage of this type of relay is that only a very small current need be employed, such as that from a battery 95, for energizing the coils 91 and 92 to provide a polarity to the magnetizable elements 86 and pass a heavy current through the conductors 88 and 90 selectively in accordance with the position of the switch 93.

It is to be understood that the grid elements 13 and 65 employed in the various figures are permanent magnets or made of magnetizable material, and in some instances from a conducting material which is neither magnetic nor magnetizable. In the devices illustrated in Figs. 11 to 14, for example, all of the elements 65 in the upper and lower grids are preferably of magnetizable material, the magnetization thereof being controlled by the associated coil or coils. The soft iron/nickel alloy employed in the elements 65 responds to the flux produced by the associated coil in the structure of Fig. 14, for example, whether energized from an A.C. or D.C. source.

What is claimed is:

1. In a relay, a pair of spaced grids forming a cavity therebetween, spaced conducting elements which break a circuit in at least one of said grids, a coil about one of said grids for producing a magnetic field when energized, and a plurality of magnetizable balls within the cavity for forming a plurality of independent conducting paths between the grids.

2. In a relay, a grid having an insulating body provided with a plurality of conducting elements, a conducting plate joining said elements at one end, a coil about said insulating body for providing a magnetic field about said elements, a second grid spaced from said first grid having elements thereof in aligned relationship with those of the first grid, and a plurality of magnetizable precision balls in said cavity to form conducting paths between said elements when the adjacent ends of the aligned elements are of opposite polarity, the polarity of at least one of said elements being controlled by the flux from said coil.

3. In a relay, a pair of grids having insulated bodies spaced apart to provide a cavity therebetween, conducting elements in said grids, said elements being in aligned relation to form independent flux paths across the cavity, a plurality of magnetizable balls in said cavity, and a coil associated with said grids for producing a plurality of conducting paths across said cavity when energized.

4. In a relay, a pair of grids having insulated bodies spaced apart to provide a cavity therebetween, conducting elements in said grids, said elements being in aligned relation to form independent flux paths across the cavity, a plurality of magnetizable balls in said cavity, a coil associated with said grids for producing a plurality of conducting paths across said cavity when energized, and conducting means joining the elements of the grids at the ends remote from the cavity.

5. In a relay, three grids having insulated bodies spaced apart to provide cavities therebetween, conducting elements in said grids, said elements being in aligned relation to form independent flux paths across the associated cavities, a plurality of magnetizable balls in said cavities, a coil associated with said grids for producing conducting paths across said cavities when energized, conducting means joining the elements of the grids at the end remote from the cavities, the central grid being spaced from the end grids by cavities containing the balls, said central grid containing spaced conducting elements aligned with those of the end grids.

6. In a relay, three grids having insulated bodies spaced apart to provide cavities therebetween, conducting elements in said grids, said elements being in aligned relation to form independent flux paths across the associated cavities, a plurality of magnetizable balls in said cavities, a coil associated with grids for producing conducting paths across said cavities when energized, conducting means joining the elements of the grids at the ends remote from the cavities, the central grid is spaced from the end grids by cavities containing the balls, said central grid containing conducting spaced elements aligned with those of the end grids, said elements of the endmost grids being permanent magnets of opposite polarity so that chains are completed in one of the cavities when the chains are broken in the other cavity upon the flow of current through the coil in one direction, the chains in the one cavity being broken and the chains in the other cavity being completed upon the reversal of current flow in the coil.

7. A relay as recited in claim 1 wherein a conducting plate joins said elements of the grid having a coil thereabout, and a conducting member forms the bottom grid in spaced relation to said top grid.

8. A relay as recited in claim 1 including means for mounting said grids for rotation relative to one another with the elements in one of said grids being disposed in a pattern which produces the alignment between more of the elements of the two grids as the grids are rotated relative to each other.

9. A relay as recited in claim 1 including means for mounting said grids for rotation relative to one another with the surface of one of the grids forming a wall of the cavity being of conical shape to vary the strength of the flux paths between the elements and to cause the balls to move to the outside in the space between the grids.

10. In a relay, a plurality of grids each having an insulating body with a plurality of conducting elements extending therethrough, said grids being spaced apart to provide cavities with the ends of the elements in substantially aligned relation, a plurality of balls of magnetic material within each of the cavities, and coils associated with some of said grids for controlling the magnetic polarity of the conducting elements thereof.

11. In a relay, a plurality of grids each having an insulating body with a plurality of conducting elements extending therethrough, said grids being spaced apart to provide cavities with the ends of the elements in substantially aligned relation, a plurality of balls of magnetic material within each of the cavities, and coils associated with some of said grids for controlling the magnetic polarity of the conducting elements thereof, the magnetic polarity of the adjacent ends of the conducting elements being such as to break the conducting chains in one cavity while making conducting chains in an adjacent cavity upon the reversal of flow of current in said coil.

12. In a pair of spaced bodies of nonmagnetizable material providing a cavity therebetween, spaced conducting elements extending through each of said bodies with the ends of elements in one body spaced from and disposed in aligned relationship with the adjacent ends of the elements in the other body, and conducting means joining the elements in each of said bodies.

13. In a relay, a plurality of spaced bodies of nonmagnetic material, a plurality of spaced conducting elements of magnetizable material extending through the bodies, said bodies being spaced apart to provide a cavity between adjacent bodies with the ends of the elements in substantially aligned relation, a plurality of balls of a material to be affected by a magnetix flux within each of the cavities, and a pair of coils one for producing a flux through said elements and for controlling the making of conductive chains formed of the balls, the second coil when energized negating the flux of the first coil to thereby break the conducting chains of the balls.

14. In a relay, a plurality of spaced bodies of nonmagnetic material, a plurality of spaced conducting elements of magnetizable material extending through the bodies, said bodies being spaced apart to provide a cavity between adjacent bodies with the ends of the elements in substantially aligned relation, a plurality of balls of a material to be affected by a magnetic flux within each of the cavities, and a pair of coils one for producing a flux through said elements and for controlling the making of conductive chains formed of the balls, the second coil when energized negating the flux of the first coil to thereby break the conducting chains of the balls, some of said elements being permanent magnets providing a flux of like polarity adjacent to the cavity, with the energization of one of the coils producing a magnetic field of the opposite polarity in the elements of the body at the other side of the cavity, the energization of the second coil negating the flux produced by the first coil and building up a flux of the same polarity as that of the elements in the body at the opposite side of the cavity to provide a repellent force therebetween.

References Cited in the file of this patent

UNITED STATES PATENTS

| | | |
|---|---|---|
| 455,067 | Tesla | June 30, 1891 |
| 680,704 | Dion | Aug. 20, 1901 |
| 781,993 | Bell | Feb. 7, 1905 |
| 1,518,020 | Traver | Dec. 2, 1924 |
| 1,644,332 | Fay | Oct. 4, 1927 |
| 2,015,156 | Richmond | Sept. 24, 1935 |
| 2,660,640 | Wolf | Nov. 24, 1953 |
| 2,668,884 | Jacobs | Feb. 9, 1954 |
| 2,687,500 | Jones | Aug. 24, 1954 |
| 2,715,166 | Fitch | Aug. 9, 1955 |